US011053565B2

(12) United States Patent
Sugiyama et al.

(10) Patent No.: US 11,053,565 B2
(45) Date of Patent: Jul. 6, 2021

(54) POST-HEATING TREATMENT DEVICE AND POST-HEATING TREATMENT METHOD

(71) Applicant: DAI-ICHI HIGH FREQUENCY CO., LTD., Tokyo (JP)

(72) Inventors: Kenji Sugiyama, Tokyo (JP); Nobuhiko Matsumoto, Tokyo (JP); Ryuta Harada, Tokyo (JP); Kenji Saita, Tokyo (JP); Takeshi Yamamoto, Tokyo (JP)

(73) Assignee: DAI-ICHI HIGH FREQUENCY CO., LTD., Tokyo (JP)

( * ) Notice: Subject to any disclaimer, the term of this patent is extended or adjusted under 35 U.S.C. 154(b) by 331 days.

(21) Appl. No.: 16/318,062

(22) PCT Filed: Jun. 13, 2017

(86) PCT No.: PCT/JP2017/021741
§ 371 (c)(1),
(2) Date: Jan. 15, 2019

(87) PCT Pub. No.: WO2018/020873
PCT Pub. Date: Feb. 1, 2018

(65) Prior Publication Data
US 2019/0233916 A1 Aug. 1, 2019

(30) Foreign Application Priority Data
Jul. 27, 2016 (JP) ............................. JP2016-147355

(51) Int. Cl.
*C21D 11/00* (2006.01)
*B23K 31/00* (2006.01)
(Continued)

(52) U.S. Cl.
CPC .............. *C21D 11/00* (2013.01); *B23K 31/00* (2013.01); *C21D 1/26* (2013.01); *C21D 1/42* (2013.01);
(Continued)

(58) Field of Classification Search
CPC . C21D 11/00; C21D 1/26; C21D 1/42; C21D 9/04; C21D 9/50; H05B 6/101; H05B 6/44; B23K 31/00
See application file for complete search history.

(56) References Cited

U.S. PATENT DOCUMENTS 5,975,405 A    11/1999   Tsuchiya et al.
9,585,201 B1 *  2/2017   Lovens .................. H05B 6/365
(Continued)

FOREIGN PATENT DOCUMENTS

CN    101927395 A    12/2010
JP    S52-25687 A    2/1977
(Continued)

OTHER PUBLICATIONS

PCT/ISA/210, "International Search Report for International Application No. PCT/JP2017/021741," dated Aug. 1, 2017.
(Continued)

*Primary Examiner* — Scott R Kastler
(74) *Attorney, Agent, or Firm* — Manabu Kanesaka

(57) ABSTRACT

A post-heating treatment device performs a post-heating treatment for a welded section of a rail, after an induction heating coil is automatically disposed at a predetermined position based on the welded section. The device includes welded section detecting unit for detecting the position of a welded section on a rail, a first coil and a second coil that form an induction heating coil, first coil moving unit for moving the first coil to a position spaced apart from the rail at a predetermined distance, second coil moving unit for
(Continued)

moving the second coil to a position separated from the rail at a predetermined distance, where the second coil is contacted to the first coil, clamping unit for pressing against the contact portion between the first coil and the second coil, and current applying unit for applying a predetermined current to the formed induction heating coil.

7 Claims, 9 Drawing Sheets

(51) Int. Cl.
| | |
|---|---|
| H05B 6/36 | (2006.01) |
| C21D 9/04 | (2006.01) |
| C21D 9/50 | (2006.01) |
| C21D 1/26 | (2006.01) |
| C21D 1/42 | (2006.01) |
| H05B 6/10 | (2006.01) |
| H05B 6/06 | (2006.01) |
| H05B 6/44 | (2006.01) |

(52) U.S. Cl.
CPC ............... *C21D 9/04* (2013.01); *C21D 9/50* (2013.01); *H05B 6/06* (2013.01); *H05B 6/10* (2013.01); *H05B 6/101* (2013.01); *H05B 6/36* (2013.01); *H05B 6/44* (2013.01); *C21D 2221/00* (2013.01); *Y02P 10/25* (2015.11)

(56) References Cited

U.S. PATENT DOCUMENTS

| | | | |
|---|---|---|---|
| 2013/0133784 A1* | 5/2013 | Kristan | ................... C21D 9/50 148/526 |
| 2015/0211087 A1 | 7/2015 | Karimine et al. | |
| 2019/0233909 A1* | 8/2019 | Sugiyama | ................ C21D 1/26 |
| 2019/0233916 A1* | 8/2019 | Sugiyama | .............. H05B 6/104 |

FOREIGN PATENT DOCUMENTS

| | | | |
|---|---|---|---|
| JP | H04-371523 | A | 12/1992 |
| JP | H10-12365 | A | 1/1998 |
| JP | H11-304985 | A | 11/1999 |
| JP | 2001-105158 | A | 4/2001 |
| JP | 5477453 | B1 | 4/2014 |
| JP | 2014-101533 | A | 6/2014 |

OTHER PUBLICATIONS

Japanese Office Action of Application No. 2018-511169 dated May 21, 2018.
Australia Patent Office, "Examination Report No. 1 for Australian Patent Publication No. 2017304972," dated Apr. 23, 2019.
Australia Patent Office, "Examination Report No. 2 for Australian Patent Publication No. 2017304972," dated Apr. 23, 2019.

\* cited by examiner

POST-HEATING TREATMENT DEVICE AND POST-HEATING TREATMENT METHOD

RELATED APPLICATIONS

The present application is National Phase of International Application No. PCT/JP2017/021741 filed Jun. 13, 2017, and claims priority from Japanese Application No. 2016-147355, filed Jul. 27, 2016, the disclosure of which is hereby incorporated by reference herein in its entirety.

TECHNICAL FIELD

The present invention relates to a post-heating treatment device and a post-heating treatment method, and more particularly, to a post-heating treatment device and a post-heating treatment method for automatically detecting a welded section of a rail jointed by welding, and removing the residual stress of the welded section by reheating.

BACKGROUND ART

Techniques for providing long rails by welding rail ends are widely employed for reduction of generation of noises, vibration, or for reduction of maintenance cost.

As illustrated in FIG. 10, the rail ends of at least two rails R1 and R2 are welded to provide a rail R having a welded section W. As shown in FIG. 10, the rail R has a head r1 to be brought into contact with a wheel, a foot r2 in contact with a sleeper, and a web r3 connecting the head r1 and the foot r2.

In the welded section W, fatigue cracks may be formed in the web r3 of the rail or starting from the web r3 in the horizontal direction starting from the web r3, due to the repeated passage of a vehicle such as a freight-train car, which is heavily loaded. This fatigue crack is affected by the strong tensile residual stress in the vertical direction (circumferential direction), generated in the web r3 at the welded section W. This tensile residual stress is generated by a temperature gradient between the welded section W and the vicinity thereof in welding.

In order to reduce such residual stress, Patent Literature 1 discloses a post-heating treatment device disposed away from the welded center of a rail at a predetermined distance (20 mm or more and 300 mm or less) in a length direction, and provided with an induction heating coil which heats the entire circumference of the rail.

This device can effectively reduce the residual stress existing in the welded section by heating at a high temperature rise rate with the use of an electromagnetic induction coil.

In addition, the induction heating coil heats the entire circumference of the rail, thus making it possible to reduce an increase in residual stress in the length direction of the rail.

CITATION LIST

Patent Literature

Patent Literature 1: Japanese Patent No. 5477453

SUMMARY OF INVENTION

Technical Problem

Now, in the case of applying a post-heating treatment to the welded section of the rail with the method disclosed in Patent Literature 1, conventionally, the heating operation is performed after an induction heating coil is disposed by manual operation of a worker at a predetermined position with reference to the center of the welded section.

However, when the work of disposing the induction heating coil is done by human operation as mentioned previously, there is a problem where it is not only cumbersome for a worker but the disposition of coils are also likely to be deviated from an appropriate position unless done by an experienced worker, and the quality of welding after the post-heating treatment is not always stable.

More specifically, to efficiently obtain a rail of stable quality after the post-heating treatment, it is desirable to automatically dispose an induction heating coil at a predetermined position with the center of the welded section as a reference, and perform the heat treatment.

However, any method for automatically disposing an induction heating coil and performing a post-heating treatment is not disclosed as for the device disclosed in Patent Literature 1.

The present invention has been made with attention focused on the foregoing points. An object of the present invention is to provide a post-heating treatment device and a post-heating treatment method with which a post-heating treatment for a welded section of a rail is performed. With this device and method, an induction heating coil can be automatically disposed at a predetermined position based on the welded section, and a heat treatment can be performed at an appropriate position of the rail.

Solution to Problem

The post-heating treatment device according to the present invention is a device that performs a post-heating treatment for a welded rail, the post-heating treatment device including welded section detecting means for detecting a position of a welded section on the rail; a first coil and a second coil that are contacted to each other to form an induction heating coil having a shape similar to the cross-section of the rail at the time of post-heating treatment, and are disposed to cover the entire circumference of the rail, at a predetermined position of the rail based on the welded section detected by the welded section detecting means; first coil moving means for moving the first coil to a position spaced apart from the rail at a predetermined distance; second coil moving means for moving the second coil to a position spaced apart from the rail at a predetermined distance, where the second coil is contacted to the first coil; clamping means for pressing against a contact portion between the first coil and the second coil moved and contacted to each other by the first coil moving means and the second coil moving means; and current applying means for applying a predetermined current to the induction heating coil formed by the first coil and the second coil, with the contact portion being pressed by the clamping means.

Further, desirably, the first coil moving means includes a first guide rail laid in a direction perpendicular to the rail; a first slider that moves the first coil along the first guide rail; and a first sensor that detects a predetermined position of the first slider on the first guide rail, the second coil moving means includes a second guide rail laid in a direction perpendicular to the rail; a second slider that moves the second coil along the second guide rail; and a second sensor that detects a predetermined position of the second slider on the second guide rail, and the movements of the first slider and the second slider along the first guide rail and the second guide rail are stopped, based on detection operations of the first sensor and the second sensor.

In addition, desirably, the second coil moving means includes a first support member fixed to the second slider, a second support member being supported to the first support member to be freely movable back and forth along a direction perpendicular to a length direction of the rail and supports the second coil, and an elastic member disposed between the first support member and the second support member, wherein the second sensor detects a position where the second slider advances a predetermined distance while compressing the elastic member after the second coil has abutted on the first coil, so that the second slider is stopped.

In addition, desirably, each of the first coil and the second coil has a set of coils including a plurality of coils, and the first and second coils form a plurality of induction heating coils when connected to each other. A plurality of the contact portions in the set of coils are arrayed with at least one stay making a pair with the corresponding contact portions. One of the paired stay preferably has a through hole and the other stay has positioning pins to be inserted in the holes thereof.

In addition, desirably, the clamping means includes a clamp arm that presses one of the stays against the other stay at the connecting portion between the first coil and the second coil, a link mechanism that rotatably supports the clamp arm, and rotation drive means for rotating the clamp arm with the link mechanism.

In accordance with the foregoing configuration, the welded section detecting means detects the position of the welded section of the rail, and thus, on the basis of the center position, the positions of the first coil and the second coil in the rail length direction can be set automatically.

In addition, at the position in the rail length direction, the first coil and the second coil are brought into abutment with each other so as to surround the entire circumference of the rail, and the positioning pins of the stays provided for the second coil are inserted into the through holes of the stay provided for the first coil, for example. Thus, the first coil and the second coil can be connected to each other without positional deviation.

In addition, the second coil is pressed against the first coil by the biasing force of the elastic member; this enables to bring the contact portions into close contact with each other.

One of the stays is pressed against and clamped toward the other stay by the clamp arms; thus it is possible to face and contact the first coil and the second coil firmly to each other, and apply a large current required for the heat treatment to the induction heating coils.

A course of process from the detection of the position of the welded section to the post-heating treatment of the rail can be automatically implemented, thereby making it possible to obtain the rail with stable quality after the post-heating treatment.

In order to solve the problem mentioned above, the post-heating treatment method according to the present invention is a post-heating treatment method where a first coil and a second coil to each other are connected that are disposed to cover the entire circumference of a rail at a predetermined position of the rail based on a welded section of the rail to form an induction heating coil having a form of a cross-sectional shape similar to the rail.

The method includes the steps of detecting the position of the welded section of the rail; moving the first coil to a position spaced apart from the rail at a predetermined distance at a predetermined position of the rail based on the detected welded section; moving the second coil to a position spaced apart from the rail at a predetermined distance where the second coil is connected to the first coil; forming the induction heating coil having a cross-sectional shape similar to the rail by pressing the connected portion of the first coil and the second coil to each other with a clamp arm; and applying a predetermined current to the induction heating coil formed of the first coil and the second coil in a state where the connected portion is pressed by the clamp arm.

Further, the step of moving the first coil to the position spaced apart from the rail at the predetermined distance desirably includes the steps of
moving the first coil in a direction toward the rail with a first slider movable along a first guide rail perpendicular to the rail;
detecting a predetermined position of the first slider on the guide rail with a first sensor; and
stopping the movement of the first slider moving along the first guide rail, based on the detection operation of the first sensor.

Further, the step of moving the second coil to the position spaced apart from the rail at the predetermined distance, where the second coil is contacted to the first coil desirably includes the steps of
moving the second coil in a direction toward the rail, with a second slider movable along a second guide rail perpendicular to the rail;
detecting, with a second sensor, a predetermined position on the second guide rail on which the second slider further travelled a predetermined distance, after the second coil is brought into abutment with the first coil; and
stopping the movement of the second slider moving along the second guide rail, based on the detection operation of the second sensor.

Still further, in the step of detection of, with the second sensor, the predetermined position on the second guide rail on which the second slider further travelled the predetermined distance, after the second coil is brought into abutment with the first coil, a second support member supporting the second coil is supported by a first support member fixed to the second slider with an elastic member interposed, and the second coil is desirably brought into abutment with the first coil with the elastic member compressed.

According to the foregoing method, detecting the position of the welded section of the rail can automatically, on the basis of the center position, determine the position of the first coil and the second coil in the rail length direction.

In addition, when the first coil and the second coil are brought into abutment with each other so as to surround the entire circumference of the rail at the position in the rail length direction, the second coil is pressed against the first coil by the biasing force of the elastic member; this enables to bring the contact portion into close contact.

Furthermore, the contact portion is pressed and clamped by the clamp arm; this enables to face the first coil and the second coil firmly to each other, and apply a large current required for the heat treatment to the induction heating coils.

In addition, the process from the detection of the position of the welded section to the post-heating treatment of the rail can be automatically implemented; thus it is possible to obtain the rail with stable quality after the post-heating treatment.

Advantageous Effects of Invention

The present invention can provide a post-heating treatment device that performs a post-heating treatment for a welded section of a rail, where an induction heating coil can be automatically disposed at a predetermined position based on the welded section, and a heat treatment can be performed at an appropriate position of the rail, and a post-heating treatment method.

DESCRIPTION OF EMBODIMENTS

Hereinafter, embodiments of a post-heating treatment device and a post-heating treatment method according to the present invention will be described with reference to the drawings. The post-heating treatment device and the post-heating treatment method according to the present invention are intended for automatically detecting a welded section of rails jointed by welding, and further performing the heat treatment, whereby tensile residual stress remaining in the welded section of the rail is removed.

Figure 1:
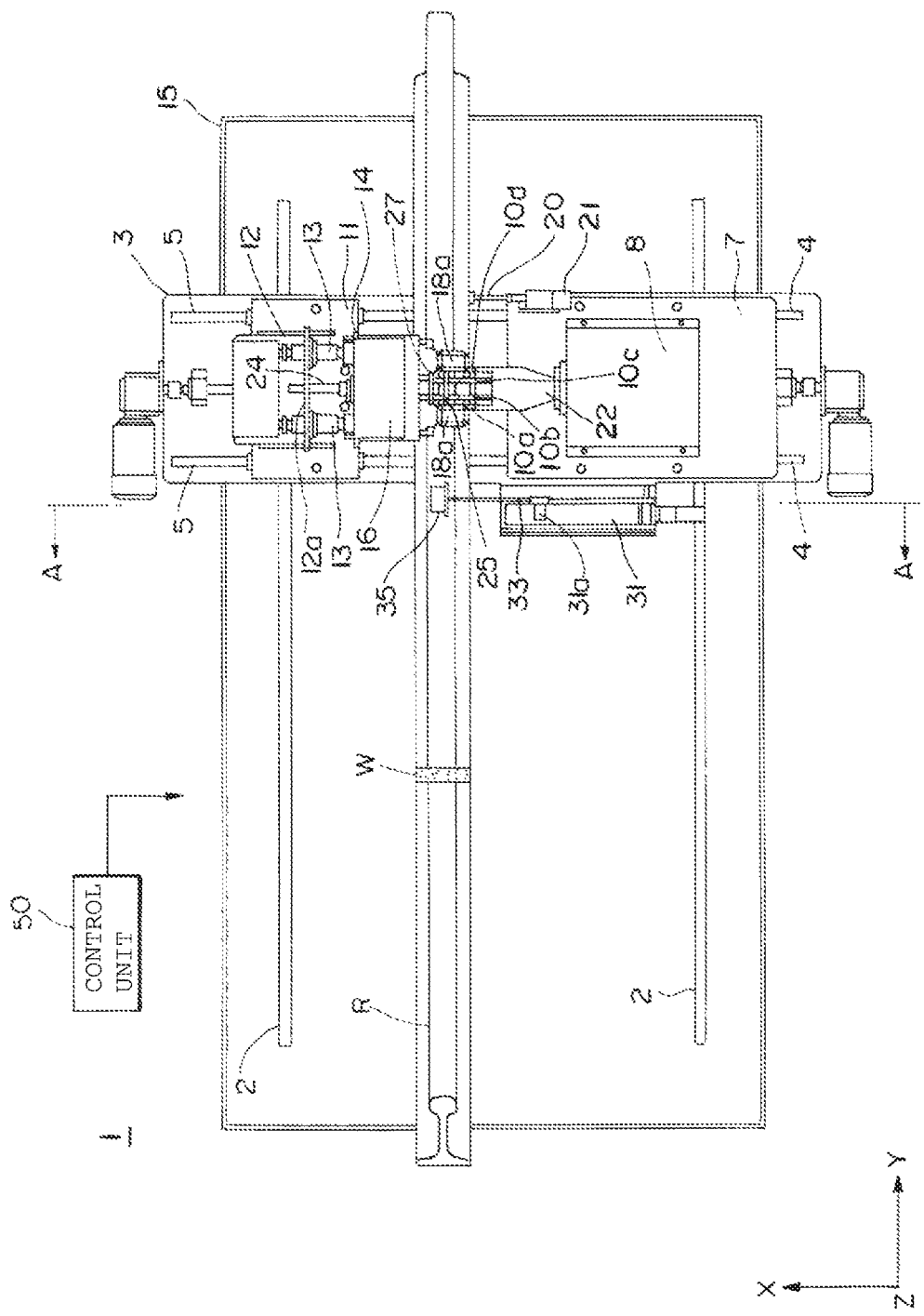
FIG. 1 is a plan view of a post-heating treatment device according to the present invention.
Figure 2:
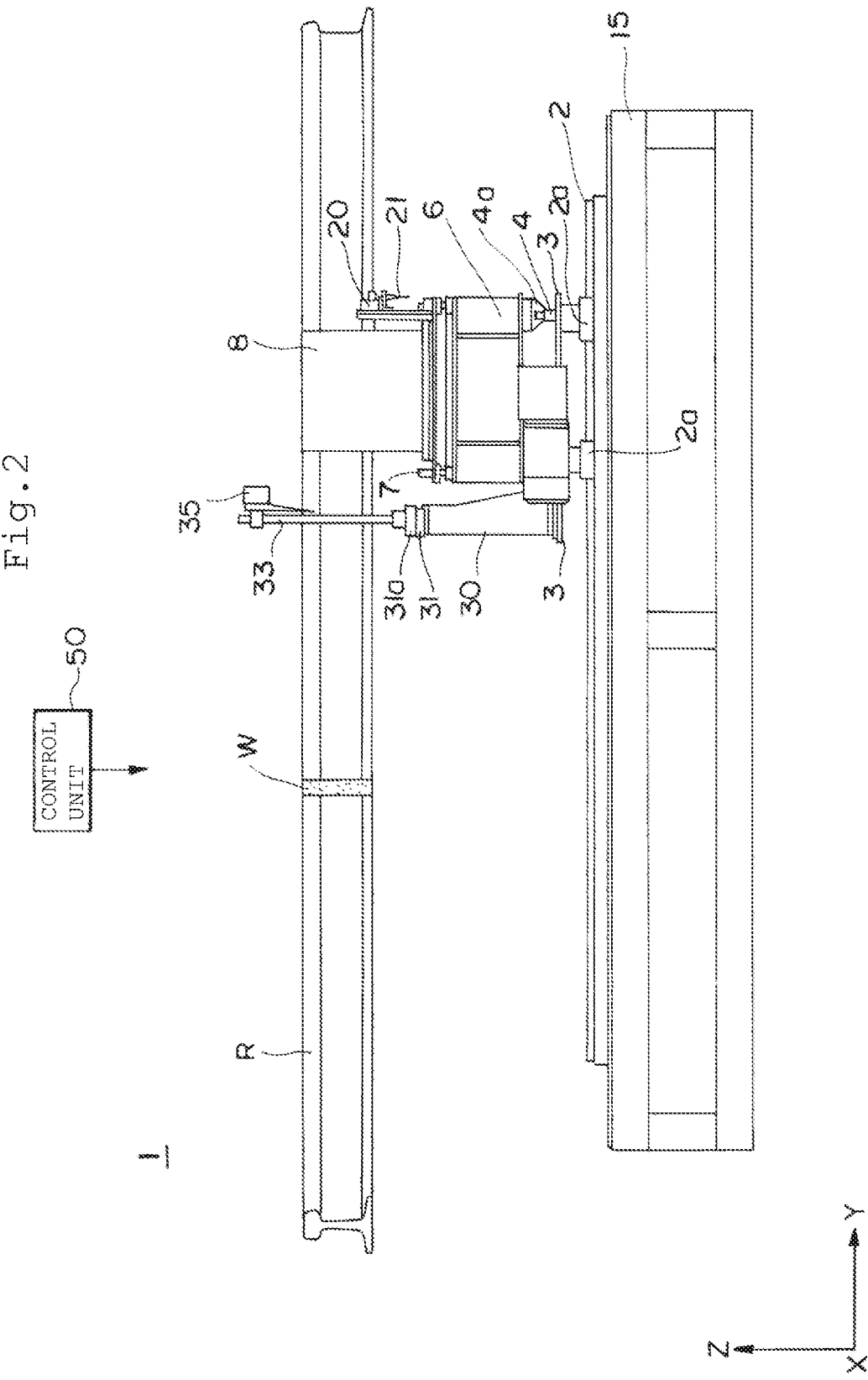
FIG. 2 is a side view of the post-heating treatment device in FIG. 1.

FIG. 1 is a plan view of a post-heating treatment device according to the present invention. FIG. 2 is a side view of the post-heating treatment device in FIG. 1, and FIG. 3 is a cross-sectional view of the post-heating treatment device taken from line A-A of Fig. The illustrated post-heating treatment device 1 includes a first base 15 above which a rail R, an object to be heat-treated, jointed by welding is disposed, and a pair of guide rails 2 laid on the first base 15 parallel to the rail R which extends in the Y direction.

The post-heating treatment device 1 further includes a second base 3 supported by a slider 2a that is movable along the guide rail 2 and formed to be extending long in the X direction perpendicular to the guide rail 2. The second base 3 is adapted to be movable by the slider 2a in the Y direction that is a longitudinal direction of the guide rail 2.

Further, although not shown, for example, a ball screw and a stepping motor for rotating the ball screw around its axis are incorporated in the guide rail 2, and the slider 2a is configured to be moved by the rotation of the ball screw. The same configurations can be adopted for other guide rails and sliders moving therealong described in the following.

Figure 3:
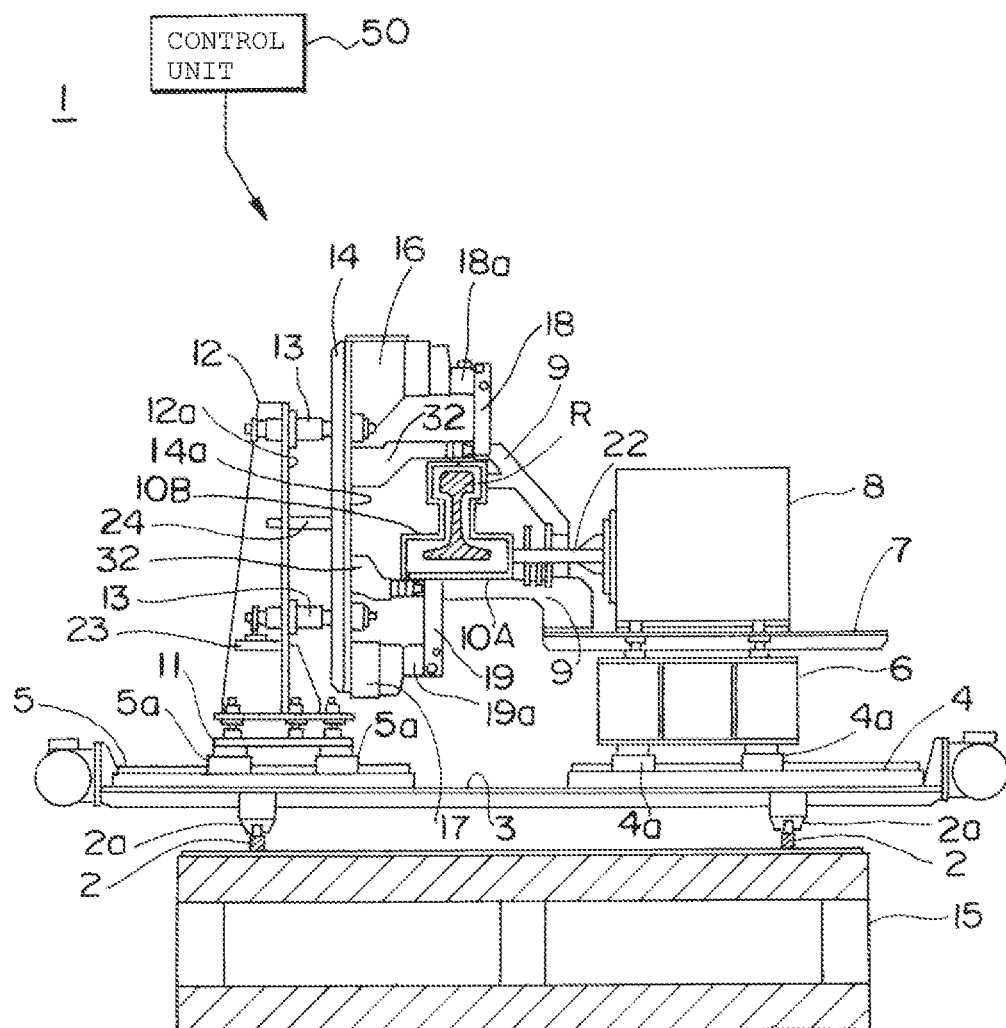
FIG. 3 is a cross-sectional view of the post-heating treatment device taken from line A-A of FIG. 1.

As shown in FIG. 3, on the second base 3, a pair of guide rails 4 that is a first guide rail as a first coil moving means, and a pair of guide rails 5 that is a second guide rail as a second coil moving means are respectively laid on both sides of the rail R in the X direction that is perpendicular to the rail R.

On the pair of guide rails 4, a box-shaped support base 6 is movably provided with a slider 4a, a first slider, interposed therebetween. In addition, a third base 7 is disposed on the support base 6, and a matching transformer 8, which is a high-frequency current transformer as a current applying means to be supplied with high-frequency electric current from a high-frequency inverter (not shown), is disposed on the third base 7.

A support plate 22, which is provided therein with a conductive wire connected to the output terminal of the matching transformer 8, is provided on one side surface facing to the rail R of the matching transformer 8. A first coil 10A is supported by the support plate 22 and a plurality of coil supports 9 serving as plate-shaped support members. The coil supports 9 are formed from a lightweight and high-strength material, such as fiber reinforced plastics (FRP).

Since the first coil 10A is supported on one side surface of the matching transformer 8 as mentioned above, the first coil is movable in the X direction along the guide rail 4 together with the matching transformer 8, and is also capable of advancing and retracting with respect to the rail R.

As shown in FIG. 3, the first coil 10A has one of the shapes obtained by dividing a similar shape in cross section to the rail R into two, asymmetric in the present embodiment. Consequently, the periphery on one side of the rail R can be covered by bringing the first coil 10A close to the rail R at a predetermined distance. The matching transformer 8 and the first coil 10A are electrically connected via the conductive wire provided in the support plate 22.

In addition, as shown in FIG. 1, a dog shaft 20 and a sensor 21, which are a first sensor and a first coil moving means, are provided on the third base 7 to detect an appropriate adjacent position, when the first coil 10A is approaching to the rail R.

The dog shaft 20 is provided to protrude toward the rail R side, and the sensor 21 is configured to be in detection operation on abutment of a head of the dog shaft 20 with the rail R; that is, the sensor 21 detects the slider 4a is located at a predetermined position on the guide rail 4. The position of the first coil 10A where the sensor 21 works is regarded as the appropriate position.

A rectangular plate-shaped fourth base 11 is horizontally disposed on the guide rail 5 with a slider 5a as a second slider interposed therebetween; the fourth base 11 is to be slidable in the X direction. As shown in FIG. 3, a bracket 12 as a first support member extending high in the vertical direction is provided on the fourth base 11, and as shown in FIGS. 1 and 3, the vertical surface 12a of the bracket 12 is oriented to the rail R side.

Dog shafts 13 protruding toward the rail R side are attached to four vertical and horizontal sites of the vertical surface 12a. A clamp mounting plate 14 as a second support member is supported by the heads of the four dog shafts 13 so as to be movable back and forth in the X direction within a predetermined range. Thus, the distance between the vertical surface 12a of the bracket 12 and the clamp mounting plate 14 is made variable within the predetermined range. In addition, a spring 24, an elastic member, with one end fixed to the bracket 12 and the other fixed to the clamp mounting plate 14 is provided in the center of the four dog shafts 13. The biasing force of the spring 24 in the extension direction maximizes the distance between the vertical surface 12a of the bracket 12 and the clamp mounting plate 14 within the variable range while the second coil member 10B is not brought into abutment with the first coil member 10A.

The clamp mounting plate 14 is held with one side 14a facing perpendicularly to the rail R. Hydraulic clamp devices 16 and 17 as a rotation driving means and a clamping means are respectively provided on an upper and lower part of the surface 14a facing to the rail R side of the clamp mounting plate 14. The hydraulic clamp devices 16 and 17 respectively have clamp arms 18 and 19, which are rotatable with link mechanisms 18a and 19a.

A plurality of coil supports 32 made of FRP, for example, is attached to a central part of the surface 14a of the clamp mounting plate 14, and the second coil 10B is supported by the coil supports 32. The second coil 10B is movable in the X direction along the guide rail 4, and capable of advancing and retracting with respect to the rail R.

The second coil 10B has a shape that is to form a shape similar to the cross section of the rail R when coupled with the first coil 10A. Both of the members, by coming to close to each other and into contact as shown in FIG. 3, can completely cover the circumference of the rail R with a predetermined interval kept.

The spring 24 is provided between the bracket 12 and the clamp mounting plate 14, and this absorbs the shock when the second coil 10B comes into contact with the first coil 10A.

In addition, a sensor 23 (a second sensor, second coil moving means) is attached to the bracket 12. When the second coil 10B approaches the rail R along the guide rail 5 and is brought into abutment with the first coil 10A, the slider 5a (bracket 12) further travels a predetermined distance against the repulsive force of the spring 24. Then the sensor 23 detects this travel; that is, the sensor detects the position of the slider 5a on the guide rail 5. On detection of the position by the sensor 23, the movement of the slider 5a stops, and at the same time the stopped bracket 12 presses against the clamp mounting plate 14 with the biasing force of the spring 24. Thus, the second coil 10B is subjected to a pressure contact to the first coil at the contact portion.

As shown in FIGS. 1 and 2, a guide rail 31 extending in the X direction is additionally provided on the first base 3 with a bracket 30 interposed therebetween, and an arm 33 that holds a laser displacement meter 35 (welded section detecting means) is provided on a slider 31a that slides along the guide rail 31. The laser light emitted from the laser displacement meter 35 is directed vertically downward, and the displacement can be measured by receiving the reflected light.

In this configuration, the laser displacement meter 35 is made movable in the Y direction by the guide rail 2, and movable in the X direction by the guide rail 31. Therefore, the laser displacement meter 35 can see, across the rail R, the variation of surface height of the rail R at any position in the length direction of the rail R.

Figure 4:
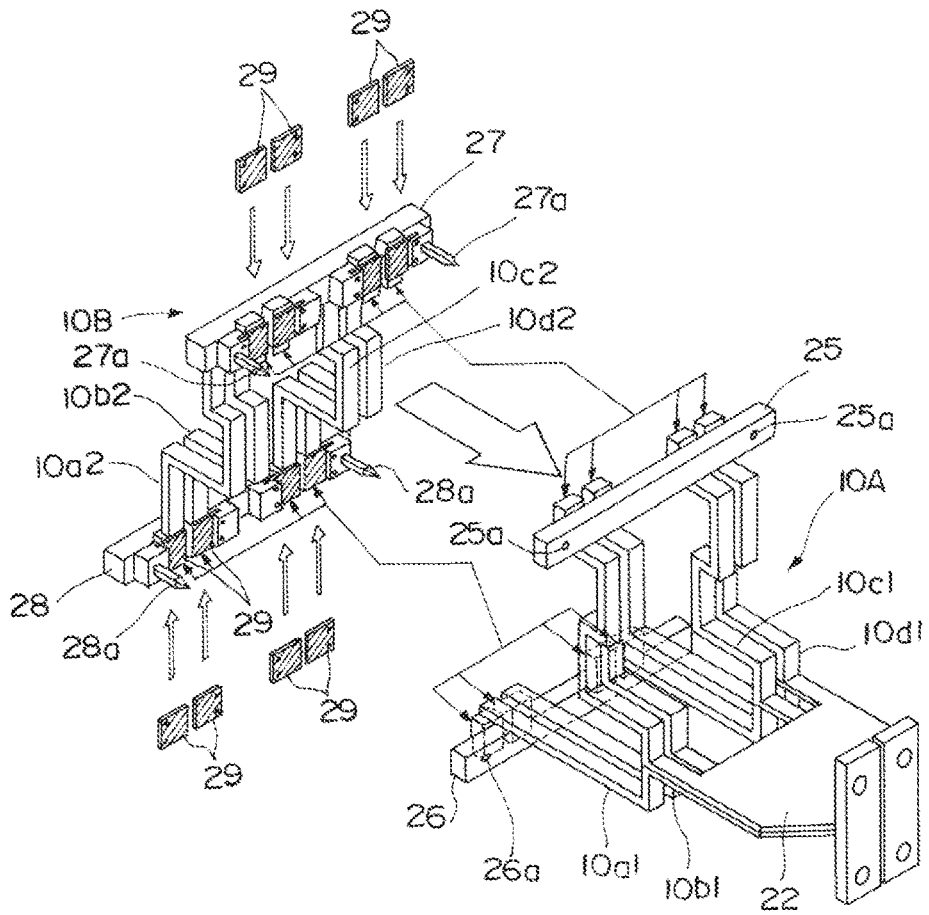
FIG. 4 is a perspective view of a first coil and a second coil separated.

Subsequently, the configurations of the first coil 10A and second coil 10B will be described in more detail with reference to FIGS. 4 and 5. FIG. 4 is a perspective view of the first coil 10A and second coil 10B in a separated state, and FIG. 5 is a perspective view of the first coil 10A and second coil 10B contacted.

Figure 5:
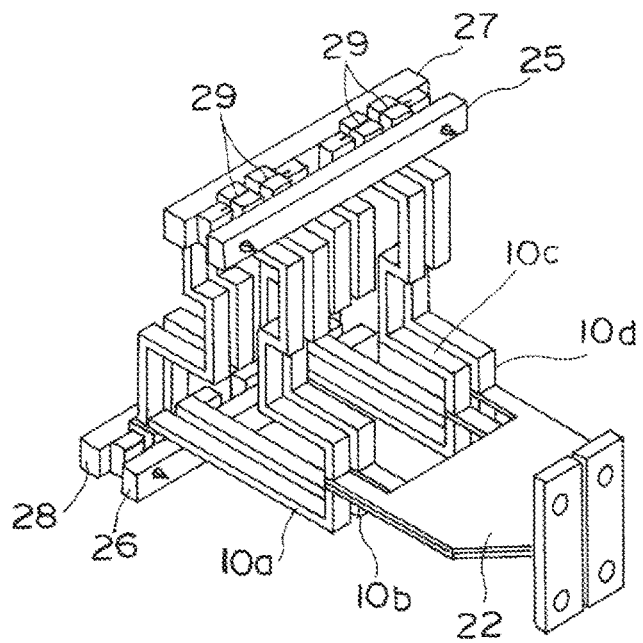
FIG. 5 is a perspective view of the first coil and second coil contacted.

As shown in FIGS. 4 and 5, each of the first coil 10A and the second coil 10B has a set of coils 10a1, 10b1, 10c1, 10d1 and a set of 10a2, 10b2, 10c2, 10d2, respectively, all of which are dividedly made of copper tubes, such that they are configured to form four one-turn induction heating coils 10a, 10b, 10c, 10d, when coupled.

In the first coil 10A, upper ends of the set of coils 10a1, 10b1, 10c1, 10d1 are fixed to a single square bar stay 25 for holding the upper ends aligned, and lower ends are fixed to a single square bar stay 26 for holding the lower ends aligned. In addition, at the both ends of the stay 25 and the stay 26 through holes 25a and 26a are formed respectively.

Meanwhile, In the second coil 10B, upper ends of the set of coils 10a2, 10b2, 10c2, 10d2 are fixed to a single square bar stay 27 to hold the upper ends in alignment, and lower ends thereof are fixed to a single square bar stay 28 to hold the lower ends in alignment. In addition, at the both ends of the stay 27 and the stay 28 positioning pins 27a and 28a are provided respectively.

As shown in FIG. 5, the upper ends of the set of coils 10a1, 10b1, 10c1, 10d1 of the first coil 10A come into contact with the upper ends of the set of coils 10a2, 10b2, 10c2, 10d2 of the second coil 10B, respectively. The lower ends of the set of coils 10a1, 10b1, 10c1, 10d1 of the first coil 10A come into contact with the lower ends of the set of coils 10a2, 10b2, 10c2, 10d2 of the second coil 10B, respectively.

In this case, the stay 25 and the stay 27 at the coil upper end form a pair, and the stay 26 and the stay 28 at the coil lower end form a pair. Then, the positioning pins 27a at the both ends of the stay 27 are inserted into the through holes 25a at the both ends of the stay 25, and the positioning pins 28a at the both ends of the stay 28 are inserted into the through holes 26a at the both ends of the stay 26. Thus, this structure enables to prevent displacement of contact portions of the four induction heating coils 10a, 10b, 10c, and 10d.

In addition, with the positioning pins 27a, 28a inserted in the through holes 25a, 26a, the hydraulic clamp devices 16, 17 operate so that the clamp arm 18 presses the stay 25 against the stay 27, whereas the clamp arm 19 presses the stay 26 against the stay 28, whereby the contact portions are clamped.

In addition, the contact portions between the first coil 10A and the second coil 10B are provided with plate members 29 made of silver (herein after silver plate member) in order to ensure electrical connection. The silver plate members 29 are desirably provided in a replaceable manner for maintainability improvement.

The first coil 10A and the second coil 10B thus coupled form the four induction heating coils 10a, 10b, 10c, 10d as described above. The supply of a high-frequency current to the coils causes to heat the entire circumference at a predetermined position of the rail R.

In the use of these induction heating coils 10a, 10b, 10c, 10d, two of them are to be arranged on each side across the welding center of the rail R with a predetermined separation from the welding center in the length direction.

The post-heating treatment device 1 includes a control unit 50 (control means) including a computer that detects the position of a rail welded section W based on the detection result of the laser displacement meter 35 and controls the whole operation.

The control unit 50 that has an operation panel including a touch panel having an information display function that can be operated by an operator, allows settings for input of the threshold value of a bead height that is to be used for detection of the welded section W.

Subsequently, the operation of the post-heating treatment device according to the present invention will be described with reference to the state transition diagrams of FIGS. 7A to 7C and FIGS. 8A to 8D, on the basis of the flow chart of FIG. 6.

Figure 6:
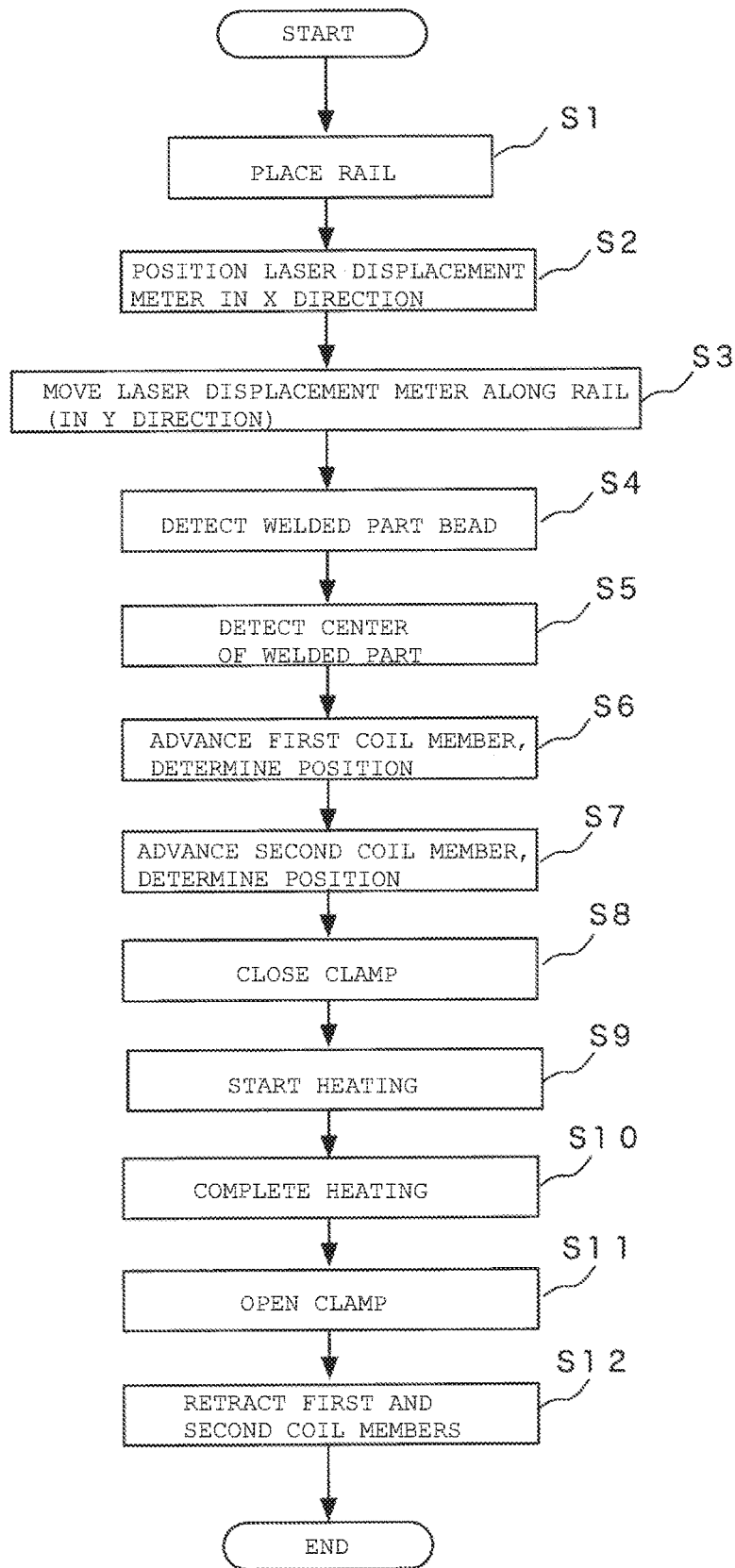
FIG. 6 is a flowchart showing a series of operations with the post-heating treatment device according to the present invention.

First, when the rail R to be subjected to a post-heating treatment is disposed on the post-heating treatment device 1, the control unit 50 detects disposition of the rail R with a sensor (not shown) (step S1 in FIG. 6).

Figure 7A:
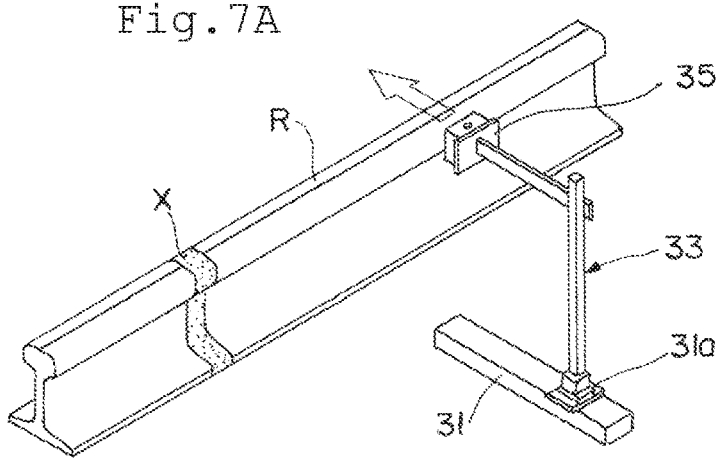
FIGS. 7A to 7C are state transition diagrams illustrating the operation of a laser displacement meter for detecting a welded section.
Figure 7B:
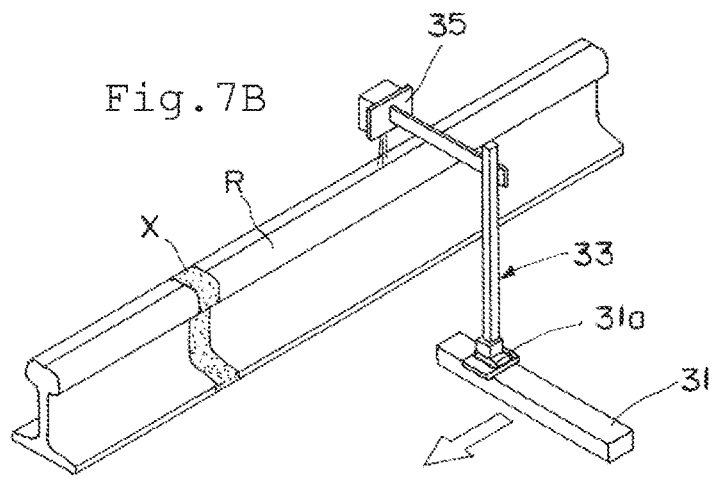

Next, in order to detect the welded section W of the rail R, the control unit 50 controls the slider 31*a* to move on the guide rail 31 toward the rail R (in the X direction) as shown in FIG. 7A, and stops the slider 31*a* at the position where the laser light from the laser displacement meter 35 hits the top surface of the rail R, for example, (step S2 in FIG. 6). According to the present embodiment, the top surface of the rail R is intended to be irradiated with the laser light, but any position may be irradiated except the bottom surface of the rail.

When the position of the laser displacement meter 35 in the X direction is determined, the control unit 50 moves the slider 2*a* at a predetermined speed along the guide rail 2. Namely, as shown in FIG. 7 (b), the laser displacement meter 35 is controlled to move along the rail R with the laser light being irradiated to the top surface of the rail R (step S3 in FIG. 6).

Figure 8:
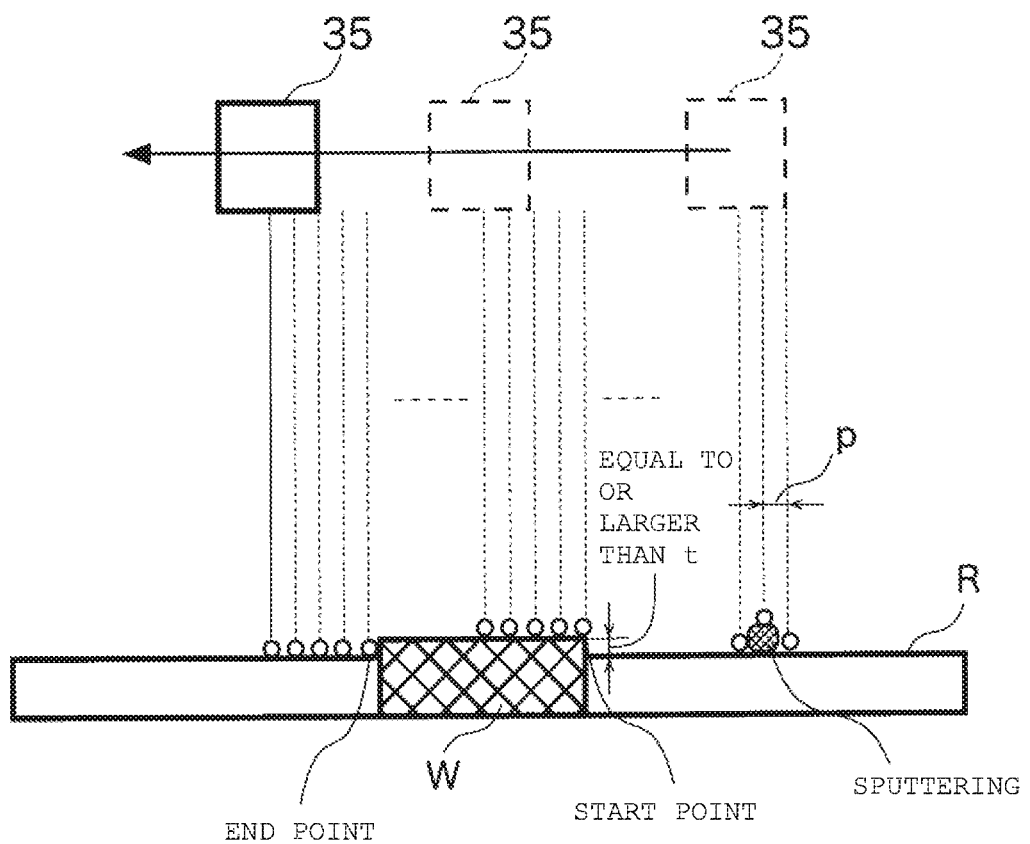
FIG. 8 is a side view schematically illustrating a laser displacement meter and rails for explaining the operation of detecting a start point and an end point of a welded section.

The feed pitch of the laser displacement meter 35 is denoted by p, the bead height threshold of the welded section W is denoted by t, and the bead width threshold is denoted by 5p. As schematically shown in FIG. 8, when five successive variations larger than the bead height threshold t (for the length of 5p) are detected the control unit 50 defines the measurement point before the five variations as a start point of the welded section W (step S4 in FIG. 6).

Figure 7C:
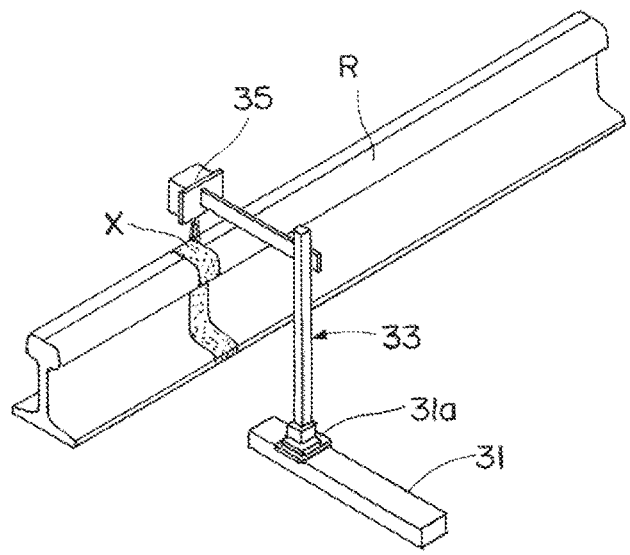

Thereafter, when five successive variations smaller than the bead height threshold t (for the length of 5p) are detected, the control unit defines the measurement point before the five variations as an end of the welded section W. As shown in FIG. 7C, the center between the start point and the end point is recognized as the center of the welded section; the positioning in the rail length direction is achieved (step S5 in FIG. 6).

Such a detection method using laser light can also be applicable to welded sections with lower heights, even if a height of a lower welded section is less than a typical bead height of 1 mm, by lowering the bead height threshold t down to on the order of 0.5 mm. This method allows preventing erroneous detection of foreign objects small in width such as a welding spatter shown in FIG. 8 because recognition of the welded section W is achieved when successive variations larger than the bead height threshold t for the length of 5p occur.

When the center position of the welded section W in the rail length direction is determined, the control unit 50 aligns the center positions (in the Y direction) of the first coil 10A and the second coil 10B with the center position of the welded section (in the Y direction), and in the first place, starts the movement of the first coil 10A toward the rail R (along the X axis) from the state of FIG. 9(*a*).

Figure 9A:
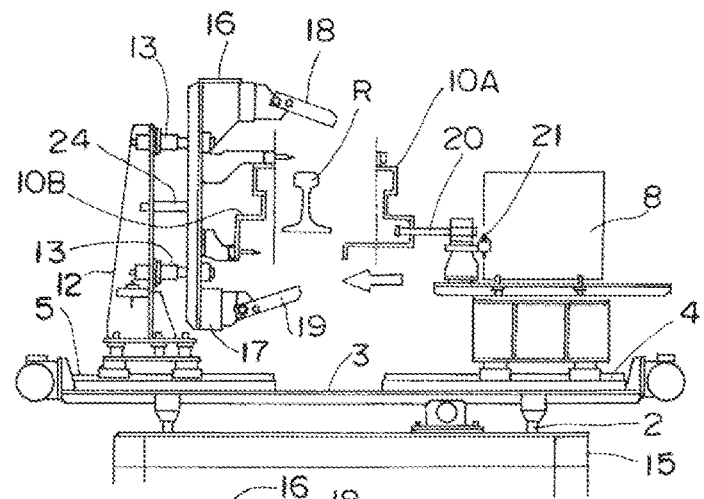
FIGS. 9A to 9D are state transition diagrams for explaining a clamping operation for the first coil and the second coil for surrounding the periphery of the rail.
Figure 9B:
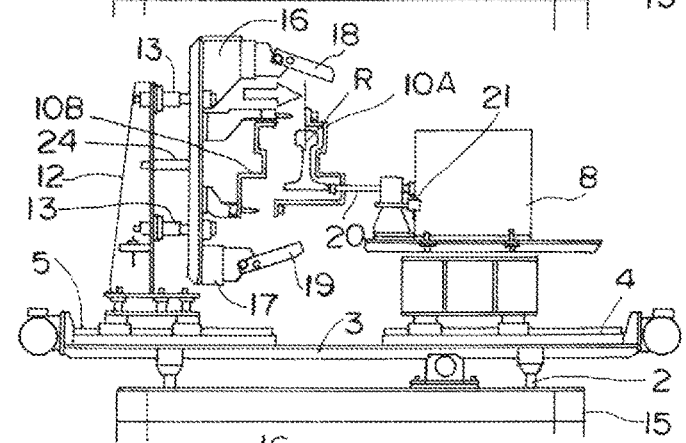

As shown in FIG. 9B, when the dog shaft 20 is brought into abutment with the rail R, the sensor 21 operates to stop the movement of the first coil 10A in the X direction (step S6 in FIG. 6).

The control unit 50 consequently causes the second coil 10B to start to move toward the rail R (along the X axis). Then, the second coil 10B is brought into abutment with the first coil 10A, and the positioning pin 27*a* of the stay 27 and the positioning pin 28*a* of the stay 28 are inserted into the through hole 25*a* of the stay 25 and the through hole 26*a* of the stay 26, respectively.

Furthermore, when the slider 5*a* travels a predetermined distance along the guide rail 5 against the repulsive force of the spring 24, the sensor 23 operates to stop the movement of the slider 5*a* (step S7 in FIG. 6).

When the second coil 10B is brought into contact with the first coil 10A, the spring 24 absorbs the impact, and this enables to reduce mechanical damage to the coil significantly, and to prevent occurring displacement of the contact position between the first coil 10A and the second coil 10B after halting of motion.

In addition, the second coil 10B is contacted to the first coil 10A with the spring 24 compressed, the second coil 10B is thus in contact with pressure to the first coil 10A by the biasing force of the spring 24 in the extension direction.

Figure 9C:
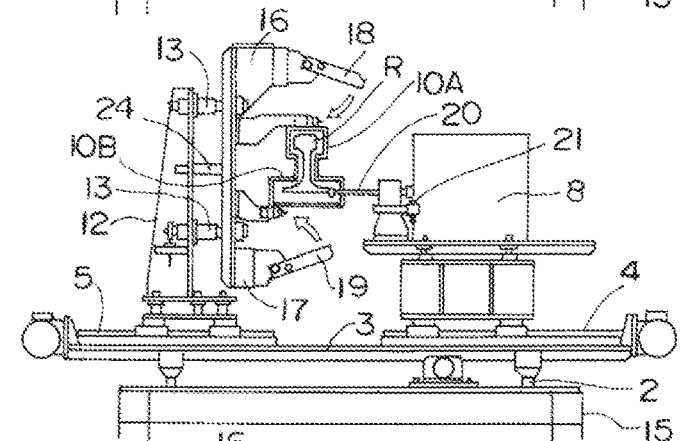

Next, as shown in FIG. 9C, the hydraulic clamp device 16 operates to rotate the clamp arm 18*a* with the link mechanism 18*a*, and to press the stay 25 with the through holes 25*a* against the stay 27 with the arm tip (clamping the contact portion). In addition, the hydraulic clamp device 17 operates to rotate the clamp arm 19 with the link mechanism 19*a*, and to press the stay 26 with the through holes 26*a* against the stay 28 with the arm tip (clamping the contact portions).

Figure 9D:
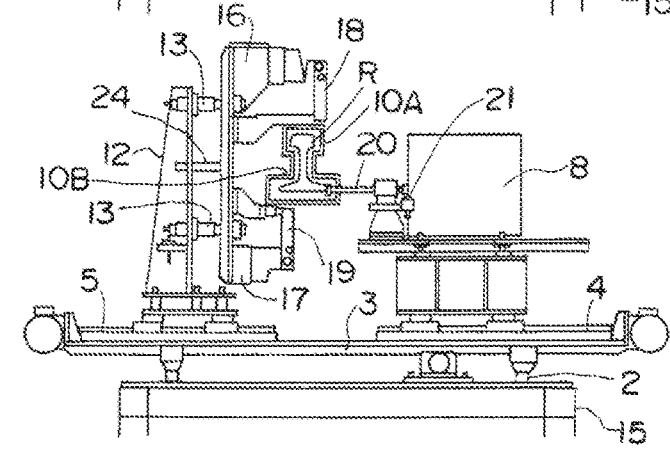
Figure 10:
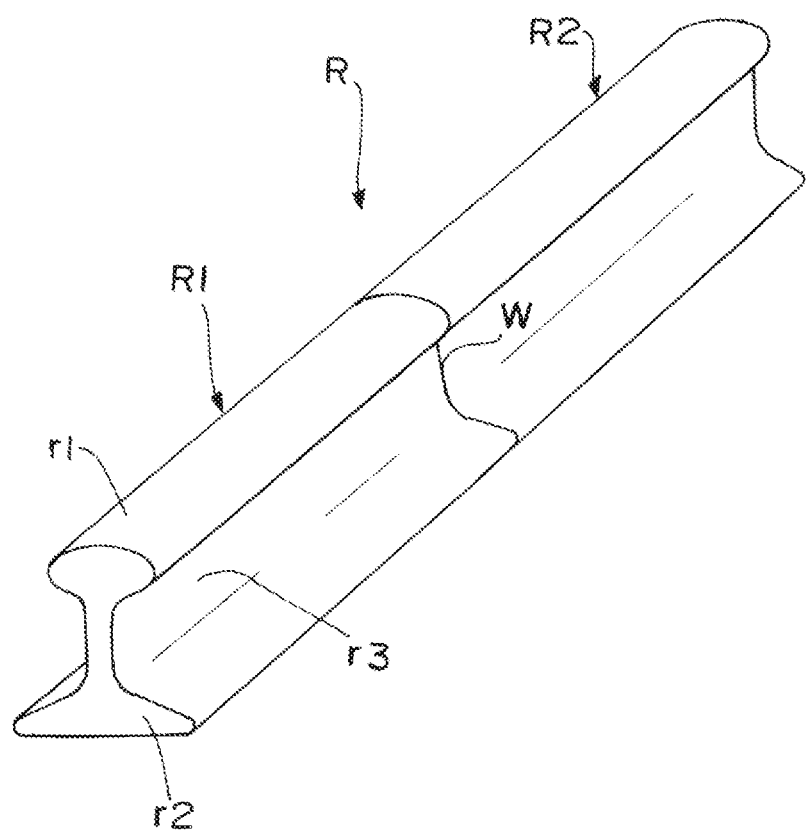
FIG. 10 is a perspective view of rails jointed by welding.

As a result, as shown in FIG. 9D, the first coil 10A and the second coil 10B are firmly coupled to each other, to thereby form the induction heating coils 10*a*, 10*b*, 10*c*, 10*d* that cover the entire circumference of the rail R at a predetermined position (Step S8 in FIG. 6).

In addition, at this time, the induction heating coils 10*a*, 10*b*, 10*c*, 10*d* are to be arranged by two on each side across the center of the welded section W of the rail R at a predetermined distance (for example, 20 mm or more and 300 mm or less) from the welding center in the length direction. Thus, the residual stress present in the welded section can be effectively reduced by heating at a high heating rate using the electromagnetic induction coils from a position away from the welding center at a predetermined distance. In addition, the induction heating coils 10*a*, 10*b*, 10*c*, 10*d* heat the entire circumference of the rail R; it is possible to prevent an increase in residual stress in the length direction of the rail R.

Subsequently, a high-frequency current is supplied from the high-frequency inverter (not shown) to a matching transformer 8, and a current transformed in the matching transformer 8 is supplied to the induction heating coils 10*a*, 10*b*, 10*c*, and 10*d*. Thus, a predetermined site of the rail R is inductively heated (step S9 in FIG. 6).

Upon completion of the heat treatment (step S10 in FIG. 6), the control unit 50 drives the hydraulic clamp devices 16 and 17 to rotate the clamp arms 18, 19 to release the clamp (step S11 in FIG. 6).

Then, each of the first coil 10A and the second coil 10B is retracted and separated, and the operation is completed (step S12 in FIG. 6).

As described in the embodiment according to the present invention, the control unit 50 detects the position of the welded section W of the rail R using the laser displacement meter 35, and thus, on the basis of the center position the positions of the first coil 10A and the second coil 10B in the rail length direction can be determined automatically.

In addition, the first coil 10A and the second coil 10B are brought into abutment with each other so as to surround the entire circumference of the rail R at the position in the rail length direction. The positioning pins 27*a*, 28*a* provided on the stays 27, 28 for the second coil 10B are inserted into the through holes 25*a*, 26*a* provided on the stays 25, 26 for the first coil 10A. This allows the first coil 10A to contact the second coil 10B without causing any positional displacement.

In addition, as the second coil 10B is pressed against the first coil 10A by the biasing force of the spring 24, the contact portions can be into close contact with each other.

Furthermore, as the stays 25, 26 are pressed against the stays 27, 28 by the clamp arms 18, 19 to clamp to fix, the first coil 10A and the second coil 10B are firmly contacted to each other, a large current required for the heating treatment can be fed to the thus formed induction heating coils 10a to 10d.

In addition, as the processes from detection of the position of the welded section W to post-heating treatment of the rail R can be automatically implemented, the rail R with stable quality can be obtainable after the post-heating treatment.

In the embodiment, an example is given where a welded section W of two rails jointed is detected and subjected to the post-heating treatment. The present invention is not limited to the example, but can be also applied to a case in which multiple welded sections of multiple rails jointed are continuously detected, and subjected to the post-heating treatment.

In addition, while the laser displacement meter 35 is used as displacement detecting means in the present embodiment, the displacement detecting means is not limited to the displacement detection using laser light, but displacement detection can be also achieved with other elements such as ultrasonic waves.

In addition, while the positioning pins 27a, 28a formed on the stays 27, 28 are inserted into the through holes 25a, 26a formed in the stays 25, 26 in the embodiment mentioned above. The present invention is not limited to the above configuration, but positioning pins may be formed on the stays 25, 26, whereas through holes may be formed in the stays 27, 28.

REFERENCE SIGNS LIST

1 Post-heating treatment device
2 Guide rail
2a Slider
3 Second base
4 Guide rail (first guide rail)
5 Guide rail (second guide rail)
6 Support base
7 Third base
8 Matching transformer (current applying means)
9 Coil support
10A First coil
10B Second coil
10a Induction heating coil
10b Induction heating coil
10c Induction heating coil
10d Induction heating coil
11 Fourth base
12 Bracket (first support member)
13 Dog shaft
14 Clamp mounting plate (second support member)
15 First base
16 Hydraulic clamp device (rotation drive means, clamping means)
17 Hydraulic clamp device (rotation drive means, clamping means)
18 Clamp arm
18a Link mechanism
19 Clamp arm
19a Link mechanism
20 Dog shaft
21 Sensor (first sensor)
22 Support plate
23 Sensor (second sensor)
24 Spring (elastic member)
25 Stay
25a Through hole
26 Stay
26a Positioning pin
27 Stay
27a Through hole
28 Stay
28a Positioning pin
29 Silver plate member
30 Bracket
31 Guide rail
31a Slider
32 Coil support
33 Arm
35 Laser displacement meter (welded section detecting means)
50 Control unit
R Rail
W Welded section

What is claimed is:

1. A post-heating treatment device that performs post-heating treatment for a welded section of a rail, the post-heating treatment device comprising:
welded section detecting means for detecting a position of a welded section of the rail;
a first coil and a second coil, upon post-heating treatment, that are contacted to each other to form an induction heating coil that forms a shape corresponding to a cross section of the rail and disposed to cover an entire circumference of the welded section detected by the welded section detecting means;
first coil moving means for moving the first coil to a position spaced apart from the rail at a predetermined distance;
second coil moving means for moving the second coil to a position spaced apart from the rail at a predetermined distance, where the second coil is contacted to the first coil;
clamping means for pressing down a contact portion at which the first coil and the second coil are moved to contact with each other by the first coil moving means and the second coil moving means, respectively; and
current applying means for applying a predetermined current to the induction heating coil formed by the first coil and the second coil with the contact portion being pressed by the clamping means.

2. The post-heating treatment device according to claim 1, wherein the first coil moving means comprises
a first guide rail laid in a direction perpendicular to the rail; a first slider that moves the first coil along the first guide rail; and a first sensor that detects a predetermined position of the first slider on the first guide rail,
the second coil moving means comprises
a second guide rail laid in a direction perpendicular to the rail; a second slider that moves the second coil along the second guide rail; and a second sensor that detects a predetermined position of the second slider on the second guide rail, and
movements of the first slider and the second slider along the first guide rail and the second guide rail are stopped respectively, based on detection operation of the first sensor and the second sensor.

3. The post-heating treatment device according to claim 2, wherein the second coil moving means further comprises a first support member fixed to the second slider; a second support member that is supported to be movable back and forth with respect to the first support member in a direction perpendicular to a length direction of the rail and supports the second coil; and an elastic member provided between the first support member and the second support member, wherein the second sensor detects a position at which the second slider advances a predetermined distance while compressing the elastic member after the second coil has abutted on the first coil and stops the second slider.

4. The post-heating treatment device according to. claim 1, wherein each of the first coil and the second coil has a set of coils including a plurality of coils, and the first coil and the second coil form a plurality of induction heating coils when connected each other, a plurality of the contact portions in the set of coils are arrayed with at least one stay making a pair with the corresponding contact portions, and one of the paired stays has through holes and the other stay has positioning pins to be inserted into the through holes thereof.

5. The post-heating treatment device according to claim 4, wherein the clamping means comprises:

a clamp arm that presses one of the stays against the other stay at the contact portion between the first coil and the second coil;

a link mechanism that rotatably supports the clamp arm; and rotation drive means for rotating the clamp arm with the link mechanism.

6. A post-heating treatment method for performing post-heating treatment to a welded section of a rail in which the first coil and the second coil, being disposed to cover an entire circumference of the welded section, are contacted to form an induction heating coil having a shape corresponding to a cross section of the rail, the method comprising:

a step of detecting the welded section of the rail;

a step of moving the first coil to a position separated from the rail by a predetermined distance at a predetermined position of the rail relative to the detected welded section of the rail;

a step of moving the second coil to a position to be in contact with the first coil, the position being separated from the rail by a predetermined distance;

a step of forming an induction heating coil having a shape corresponding to a cross section of the rail by pressing, with a clamping arm, a contact portion where the first coil and the second coil are contacted with each other; and a step of applying a predetermined current to the induction heating coil formed by the first coil and the second coil while the contact portion is pressed by the clamping arm.

7. The post-heating treatment method according to claim 6, wherein the step of moving the first coil to the position separated from the rail at the predetermined distance comprises the steps of:

moving the first coil in a direction toward the rail with a first slider movable along a first guide rail perpendicular to the rail;

detecting a predetermined position of the first slider on the guide rail with a first sensor; and stopping the movement of the first slider moving along the first guide rail, based on detection operation of the first sensor, wherein a step of moving the second coil to a position to be in contact with the first coil, the position being separated from the rail by a predetermined distance, comprises steps of moving the second coil in a direction toward the rail with a second slider movable along a second guide rail perpendicular to the rail;

detecting a predetermined position on the second guide rail of the second slider further travelling a predetermined distance with a second sensor, after the second coil is brought into abutment with the first coil; and stopping the movement of the second slider moving along the second guide rail, based on detection operation of the second sensor, and wherein in the step of detecting a predetermined position on the second guide rail of the second slider further travelling a predetermined distance with a second sensor after the second coil is brought into abutment with the first coil, a second supporting member supporting the second coil is supported through an elastic member by a first support member fixed to the second slider, and the second coil abuts against the first coil in a state where the elastic member is compressed.

* * * * *